(12) United States Patent
Keates

(10) Patent No.: US 9,853,471 B2
(45) Date of Patent: Dec. 26, 2017

(54) MECHANISM FOR EXTENDING CYCLE LIFE OF A BATTERY

(71) Applicant: Intel Corporation, Santa Clara, CA (US)

(72) Inventor: Andrew Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 14/572,757

(22) Filed: Dec. 16, 2014

(65) Prior Publication Data

US 2016/0172886 A1    Jun. 16, 2016

(51) Int. Cl.
*H02J 7/00*    (2006.01)

(52) U.S. Cl.
CPC .......... *H02J 7/0052* (2013.01); *H02J 7/0073* (2013.01); *H02J 2007/005* (2013.01); *H02J 2007/0098* (2013.01)

(58) Field of Classification Search
CPC ...................................... H02J 7/077
USPC ........................................ 320/130
See application file for complete search history.

(56) References Cited

U.S. PATENT DOCUMENTS

| | | | |
|---|---|---|---|
| 2007/0075678 A1* | 4/2007 | Ng ......................... | H02J 7/047 320/106 |
| 2008/0136368 A1 | 6/2008 | Hajiaghajhani | |
| 2013/0211641 A1 | 8/2013 | Fujii | |
| 2014/0077769 A1* | 3/2014 | Maleki ..................... | H02J 7/008 320/136 |
| 2016/0146895 A1* | 5/2016 | Yazami .............. | G01R 31/3679 324/426 |

FOREIGN PATENT DOCUMENTS

| | | |
|---|---|---|
| JP | 2005037230 | 2/2005 |
| JP | 2007323999 | 12/2007 |
| JP | 2011235849 | 11/2011 |

(Continued)

OTHER PUBLICATIONS

Smart Battery System (SBS) Specifications, for example, SBS Specification, Revision 1.1, Dec. 11, 1998, 39 pages total. copyright Benchmarq Microelectronics Inc. et al. (available at www.sbs-forum.org).

(Continued)

*Primary Examiner* — Thuan Do
(74) *Attorney, Agent, or Firm* — Green, Howard & Mughal LLP

(57) ABSTRACT

Described is an apparatus for extending cycle-life of a battery cell, where the apparatus comprises: a monitor to monitor a rate of degradation of a battery cell overtime; a comparator to compare the rate of degradation with a threshold; and logic to adjust one or more charge parameters of the battery cell when the rate of degradation crosses the threshold. Described is a method which comprises: monitoring a rate of degradation of a battery cell overtime; comparing the rate of degradation with a threshold; and adjusting one or more charge parameters of the battery cell when the rate of degradation crosses the threshold. Described is a machine-readable storage media having machine executable instructions stored thereon that, when executed, causes one or more processors to perform the method described above.

20 Claims, 6 Drawing Sheets

100

(56) References Cited

FOREIGN PATENT DOCUMENTS

WO        2009049227        4/2009

OTHER PUBLICATIONS

I2C—bus specification (e.g., UM10204 I2C—bus specification and user manual, Rev. 6—Apr. 4, 2014 (available at http://www.nxp.com/)); 64 pages.
Charger Specification, for example, Charger Specification Revision 1.1 Published Dec. 11, 1998 Copyright 1996, 1997, 1998, Benchmarq Microelectronics Inc. et al. (available at sbs-forum.org/specs/sbc110.pdf).
International Search Report and Written Opinion for PCT Patent Application No. PCT/15/60945, dated Apr. 8, 2016.
International Preliminary Report on Patentability for International Patent Application No. PCT/US2015/060945, dated Jun. 29, 2017.

\* cited by examiner

MECHANISM FOR EXTENDING CYCLE LIFE OF A BATTERY

BACKGROUND

Battery cell cycle life (i.e., number of charge/discharge cycles) is a function of several factors. The nature and purity of the battery cell ingredients are a legacy of the manufacturing environment and, as such, a degradation factor that a device using the battery cell cannot change. The manner in which the battery cell is treated in operation, however, also affects the cycle life of the battery cell.

Battery cell data sheets set operational parameters for the battery cells. Battery management systems should ensure that the battery cells are operated within limits specified in their data sheets. Devices using the battery cells should ensure that the charge rate is appropriate for the temperature and voltage of the battery cell and should not allow the battery cell to discharge if the temperature is too high, which typically means in excess of 60 degrees Celsius in the case of batteries used for portable electronics.

What battery management systems cannot do is control the physical environment they are subjected to. Users living in a hot climate will inevitably subject their devices to high temperatures where chemical side reactions in the battery cell cause it to degrade, thus reducing the cycle-life of the battery cell.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

It is generally considered that Lithium-ion (Li-ion) battery cells can be worn out by charging or discharging them too fast. Of these, charging fast appears to be most detrimental to the battery cells. So, conversely, slow charging may be expected to increase the cycle-life of the battery cells. Charging battery cells to less than their maximum charge termination voltage (also referred to here as charge voltage) increases the cycle-life of the battery cell. It is for this reason that hybrid electric vehicles often use a window between, for example, 40% to 60% state of battery charge, so that the batteries may be charged and discharged many times a day with minimized cell degradation.

Figure 1:
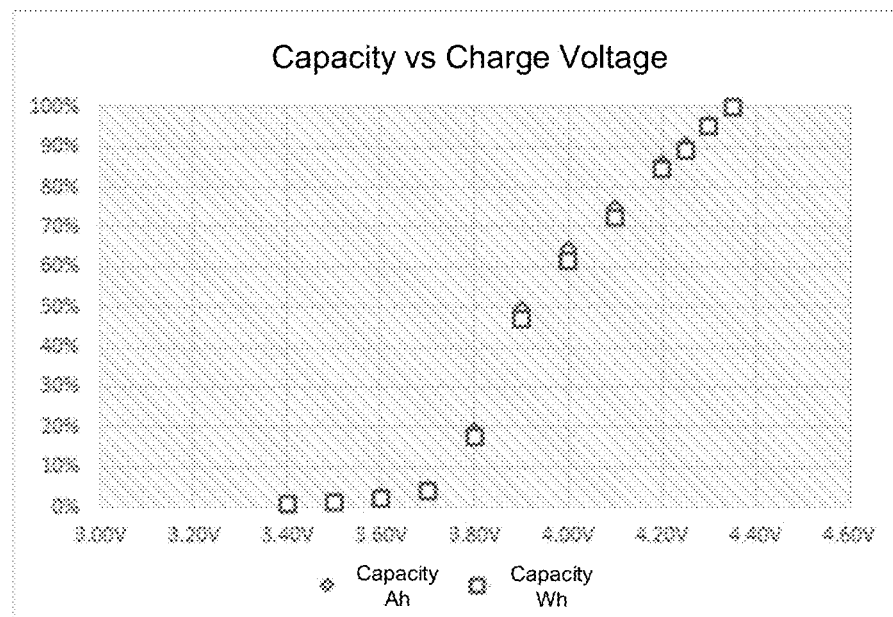
FIG. 1 illustrates a plot showing a relationship between battery cell capacity and charge voltage.

FIG. 1 illustrates plot 100 showing a relationship between battery cell capacity and charge voltage. Here, x-axis is charge voltage in Volts (V), and y-axis is capacity of the battery cell in percentage (%). As charge voltage increases above a threshold (in this example, above 3.70V), the energy stored in the battery cell increases. Also, reducing the charge voltage reduces energy stored in the battery cell. For example, reducing charge voltage by 0.05V results in a loss of about 4% in the capacity measured in Ampere-hour (Ah) and about 5% measured in Watt-hour (Wh). One reason for the greater loss measured in Wh is that the average battery cell voltage decreases in addition to the milli-Ampere-hour (mAh) capacity.

Li-ion batteries may not deteriorate at a uniform rate. Even battery cells from the same production batch may behave differently when cycled (i.e., when charged and discharged). Some exhibit a measured, constant degradation rate. Others exhibit a degradation rate that deteriorates as the battery cell gets older.

Figure 2:
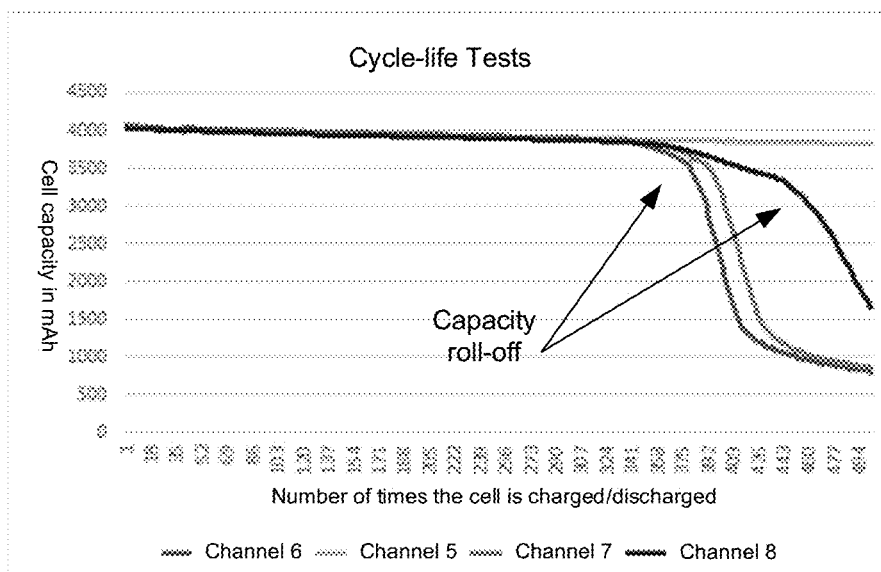
FIG. 2 illustrates a plot where capacity of the batteries fall off a cliff or extremely degrade after a certain number of charge/discharge cycles.

FIG. 2 illustrates plot 200 where capacity of the batteries fall off a cliff or extremely degrade after a certain number of charge/discharge cycles. Here, the x-axis is the number of charge/discharge cycles, and y-axis is the cell capacity of the cell in mAh. Plot 200 illustrates the capacity roll off for four different battery cells—cell1, cell2, cell3, and cell4. In this example, most battery cells work as expected even after 300 numbers of charge and discharge cycles, and then their capacity dramatically reduces with a greater number of charge/discharge cycles (i.e., the rate of deterioration of the cells dramatically increases). This phenomenon is analogous to falling off a cliff.

In some embodiments, the rate of deterioration (or rate of degradation) of battery cells is monitored over time when the battery cells are charged and discharged. In some embodiments, where an acceleration of degradation is detected, charge parameters associated with the battery cells are adjusted to reduce charge stress. In some cases, adjusting charge parameters may cause the battery cells to take a little longer time to charge and deliver slightly less energy may be loaded, but the deterioration rate is slowed down.

There are many technical effects of the various embodiments. For example, the apparatus and methods discussed here enable new batteries to be charged at a rate which would fully charge the battery in reasonable time (e.g., approximately 2 hours, typical of portable electronic products), to a high charge voltage, in order to minimize the charge time and maximize the energy storage. In an older pack, if accelerated degradation is detected, long-term energy storage capability may be preserved. The accelerated degradation may be mitigated by sacrificing charge time or short-term, capacity, according to some embodiments.

The apparatus and methods discussed here enable new technology batteries with limited cycle-life to be used for a longer time by providing a mechanism to reach cycle-life goals through adjustment of charge parameters (e.g., by adjusting charge current and/or charge voltage). Various embodiments discussed here also extend the useful life of battery packs, causing fewer replacements and ensuring that the battery packs meet their advertised, specified, and guaranteed lifespans. Some embodiments discussed here also enable faster charging without fear that faster charging operation causes a failure to reach the battery longevity guarantee. One advantage is that of making performance tradeoffs only for cells which, perhaps due their operating environment, have developed a faster pace of degradation. Other technical effects will be evident from the discussion of various embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical or wireless connection between the things that are connected, without any intermediary devices. The term "coupled" means either a direct electrical or wireless connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−20% of a target value.

For purposes of the embodiments, the transistors in various circuits or logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Figure 3:
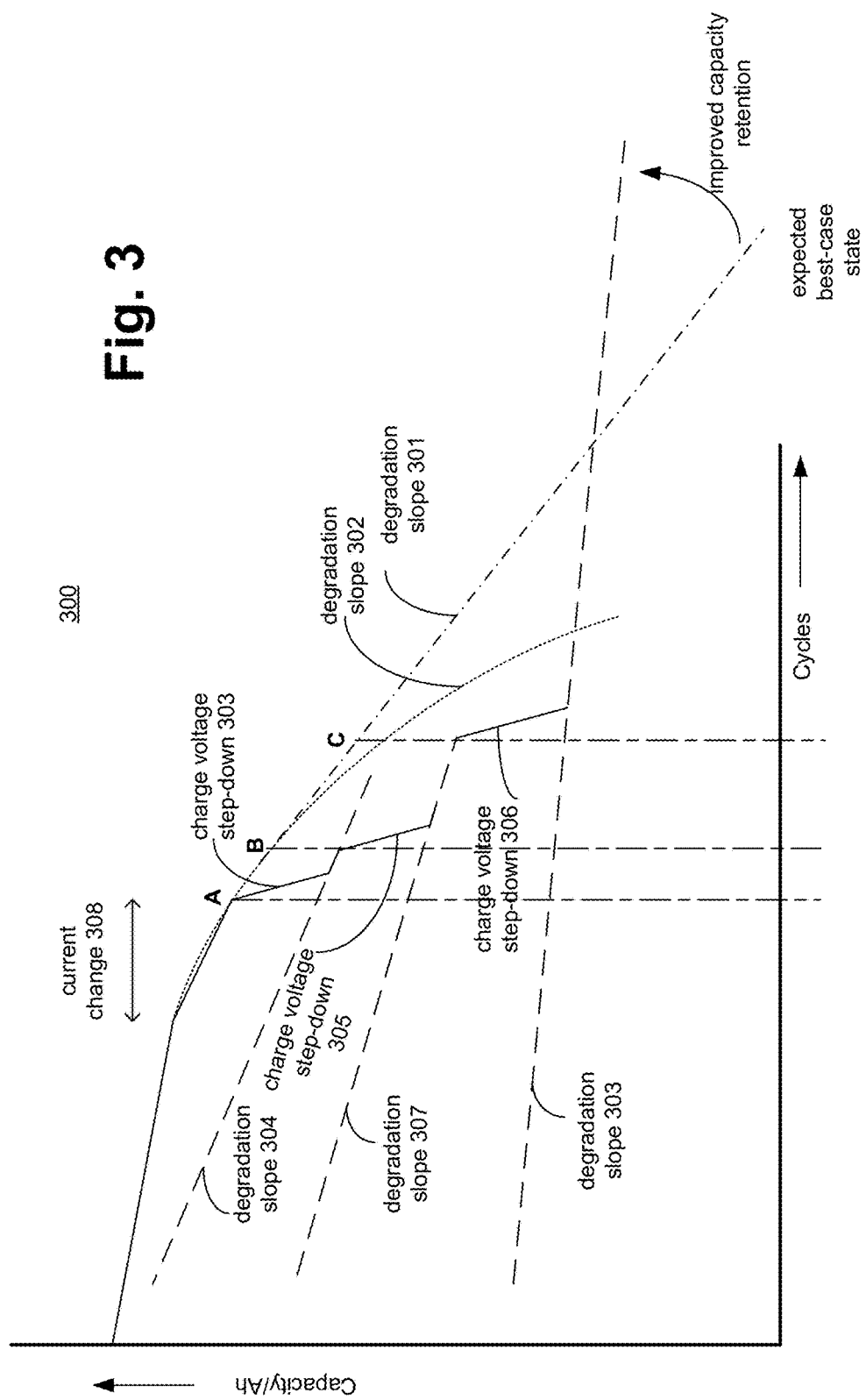
FIG. 3 illustrates a plot showing improvement in the degradation slope of a battery with reduction in charge voltage, according to some embodiments of the disclosure.

FIG. 3 illustrates plot 300 showing improvement in the degradation slope of a battery with reduction in charge voltage, according to some embodiments of the disclosure. Here, the x-axis is number of charge-discharge cycles, and the y-axis is Capacity/Ah. Plot 300 shows a waveform indicating degradation of a battery as the number of charge-discharge cycles increases. In ideal conditions, there would be no degradation. In practice, however, the energy storage capacity of battery cells diminishes slightly with each successive discharge/charge cycle. One would expect, that the slope (or rate) of degradation is substantially linear. However, typically degradation of a battery from cycle to cycle may increase and stabilize as illustrated by slope 301, or may continue to accelerate as illustrated in slope 302.

The rate of degradation can be expressed as $\Delta$Capacity/$\Delta$cycles, where $\Delta$Capacity is the difference in capacities over several different cycles, and where $\Delta$cycles is a that number of cycles. There are two methods for slowing down the degradation rate. These methods are to introduce a slower charge to the battery, or to decrease the charge termination voltage of the battery. In some embodiments, when current (or charge) to the battery is reduced (i.e., slower charge is provided to the battery) over a number of charge-discharge cycles then degradation slope may flatten. In some embodiments, when current to the battery is reduced over a number of charge-discharge cycles as indicated by region 308, degradation slope may remain substantially unchanged. In some embodiments, reducing charge termination voltage to the battery reduces the Capacity/Ah of the battery, but makes the degradation slope flatter.

For example, when at point A, which is the point where degradation acceleration begins, a charge voltage step down 303 alters the degradation slope 302 to degradation slope 304. Degradation slope 304 is flatter than degradation slope 302. Flatter degradation slope 304 extends battery life at the cost of lower capacity. After more charge-discharge cycles the flatter degradation slope 304 may begin to accelerate in degradation again. At that point, charge termination voltage can be reduced further to mitigate the degradation rate.

For example, when at point B, a charge voltage step-down 305 alters the degradation slope 304 to 307. Degradation slope 307 is flatter than degradation slopes 302 and 304. Flatter degradation slope 307 extends battery life at the cost of lower capacity than the capacity of the battery with degradation slopes 302 and 304. After more charge-discharge cycles, the flatter degradation slope 307 may begin to accelerate in degradation again. At that point, charge termination voltage can be adjusted again (i.e., reduced further).

For example, when at point C, a charge voltage step-down 306 alters the degradation slope 307 to 303. Degradation slope 303 is flatter than degradation slopes 302, 304, and 307. Flatter degradation slope 303 extends the battery life at the cost of short-term lower capacity than the capacity of the battery with degradation slopes 302, 304, and 307. In some embodiments, capacity retention of the battery improves, compared to the expected best-case state of the battery, using the new lower charge (or termination) voltage. This is illustrated by the intersection of an improved degradation line 303 with the original trajectories of lines 301 and 302.

In some embodiments, to detect an acceleration of degradation, a moving average of cycle-to-cycle degradation is calculated. In some embodiments, an acceptable degradation rate is defined (e.g., a threshold) and an average cycle-to-cycle degradation is compared to the threshold. An acceptable degradation rate may be 0.2% per cycle, for example. In one example, 0.2% per cycle degradation rate may translate to a 10-cycle loss of 1.98%. In another example, 0.2% per cycle degradation rate may translate to a 100-cycle loss of 18.14%. Typically, a 20% loss in battery capacity is considered the end-of-life of the battery. In an example, based on the desired cycle-life (e.g., 500 charge-discharge cycles), a trajectory equivalent to end-of-life at a lower number of charge-discharge cycles (e.g., 100) can be selected as a trigger (or detection point) to address a high degradation rate.

When such a detection point is identified, then in some embodiments, charge current for the battery is reduced (e.g., by 5%) while preserving the full charge termination voltage. The degradation rate is then monitored again. If the degradation rate does not change or remains above the acceptable degradation rate, then in some embodiments, charge termination voltage is reduced to alter the degradation rate. In some embodiments, after a detection point is identified, charge termination voltage is reduced without altering the charge current. The degradation rate is then monitored again. If the degradation rate does not change or remains above the acceptable degradation rate, then in some embodiments, charge current is reduced to alter the degradation rate.

Figure 4:
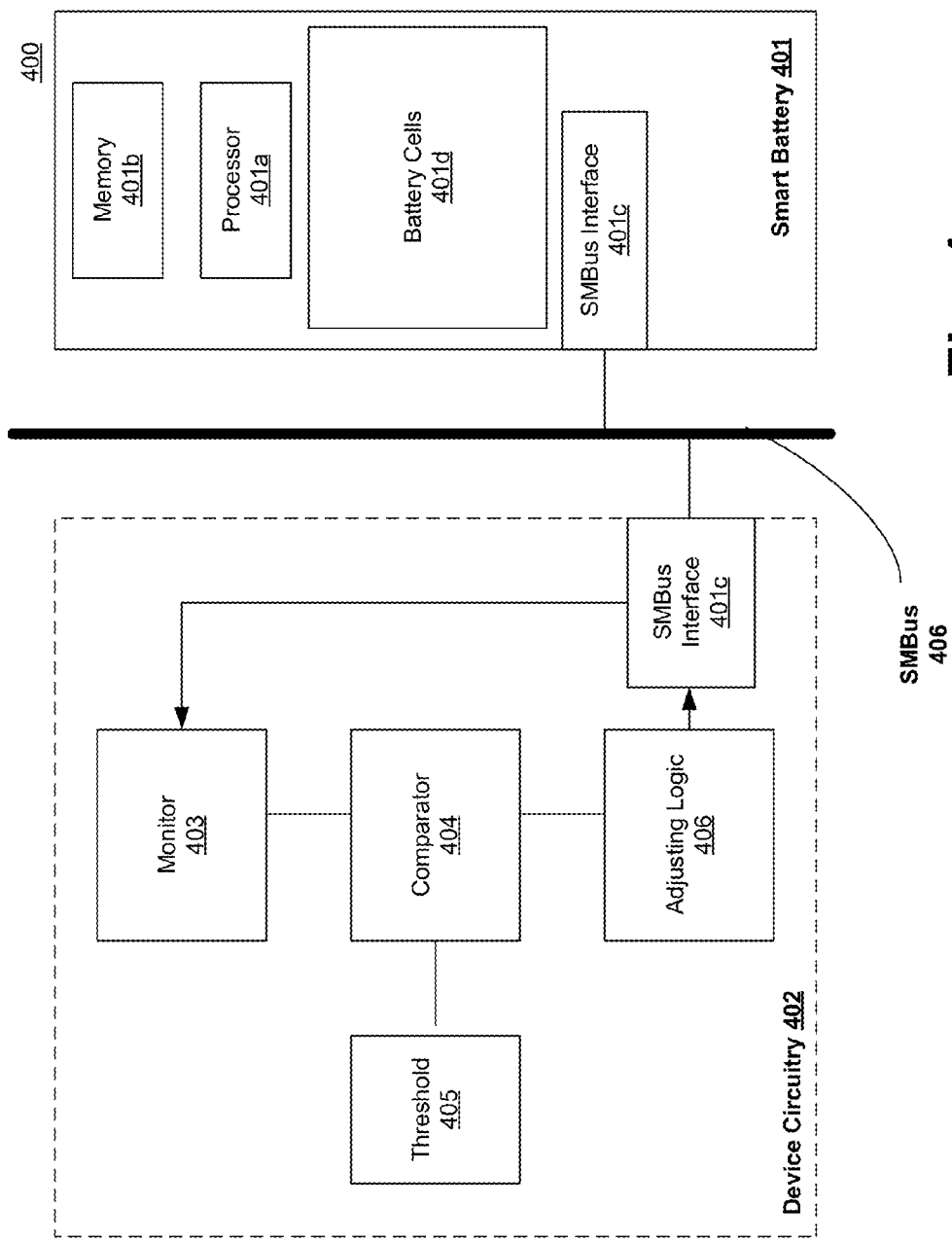
FIG. 4 illustrates an apparatus for extending the cycle-life of a battery by detecting degradation acceleration and changing one or more parameters for the battery to reduce degradation rate, according to some embodiments of the disclosure.

FIG. 4 illustrates apparatus 400 for extending cycle-life of a battery by detecting degradation acceleration and changing one or more parameters for the battery to reduce degradation rate, according to some embodiments of the disclosure. It is pointed out that those elements of FIG. 4 having the same reference numbers (or names) as the elements of any other figure can operate or function in any manner similar to that described, but are not limited to such.

In some embodiments, apparatus 400 comprises Smart Battery 401 and Device Circuitry 402 to extend the cycle-life of a battery by detecting degradation acceleration and changing one or more parameters for the battery to reduce degradation rate. In some embodiments, Smart Battery 401 includes Processor 401a (e.g., "Gas Gauge" processor), Memory 401b, and interface 401c for communicating with other devices, and Battery Cells 401c.

In some embodiments, Smart Battery 401 complies with the Smart Battery System (SBS) Specification, for example, SBS Specification Revision 1.1 Published Dec. 11, 1998 (available at www.sbs-forum.org) or other revisions. In some embodiments, Smart Battery 401 is equipped with specialized hardware that provides present state, and calculated and predicted information to other devices via software or firmware control.

In some embodiments, Device Circuitry 402 complies with the Smart Battery Charger Specification, for example, Charger Specification Revision 1.1 Published Dec. 11, 1998 (and other revisions). In some embodiments, Device Circuitry 402 is part of a Smart Battery Charger as defined by the above specification. In some embodiments, Smart Battery Charger can periodically communicate over interface 401c with Smart Battery 401 and can alter its charging characteristics in response to information provided by Smart Battery 401. In some embodiments, Device Circuitry 402 is a Level 2 type Smart Battery Charger as defined by the above specification. In some embodiments, circuitry 402 is a Level 3 type Smart Battery Charger as defined by the above specification.

In some embodiments, interface 401c is a System Management Bus (SMBus) interface as defined by Smart Battery Charger Specification, for example, Smart Battery Charger Specification Revision 1.1 Published Dec. 11, 1998 (or other revisions). SMBus 401c may be an implementation of a PC-bus (Personal Computer bus) that provides data protocols, device addresses and additional electrical requirements that are designed to physically transport commands and information between two or more devices including Smart Battery 401 and Smart Charger 402. In other embodiments, interface 401c is another type of interface. For example, interface 401c is an I$^2$C (Inter-Integrated Circuit) compliant interface as defined by the I2C-bus specification (e.g., UM10204 I2C-bus specification and user manual, Rev. 6-4 April 2014 (available at http://www.nxp.com/)).

In some embodiments, circuitry 402 comprises interface 401c, Monitor 403, Comparator 404, Threshold 405, and Adjusting Logic 406. In some embodiments, Monitor 403 comprises logic and/or circuits to compute degradation rate according to information provided by Smart Battery 401 via interface 401c and SMBus 406. The rate of degradation can be expressed as $\Delta$Capacity/$\Delta$cycles. In some embodiments, Monitor 403 computes the degradation rate over multiple charge-discharge cycles of Smart Battery 401. For example, Monitor 403 computes the degradation rate over five charge-discharge cycles. Some sub-components of circuitry 402 may be located in other circuitries. For example, Threshold 405 may be a storage unit located outside of circuitry 402; Monitor 403 may be implemented as software module in an operating system, etc.

In some embodiments, Comparator 404 compares a threshold stored in Threshold 405 with a degradation rate computed by Monitor 403. In some embodiments, if the degradation rate is greater than the threshold, Adjusting Logic 406 instructs Smart Battery 401 (via SMBus 402) to adjust one or more parameters for the battery to reduce the degradation rate. The one or more parameters include charge current and charge-discharge (or termination) voltage. In some embodiments, Adjusting Logic 406 instructs Smart Battery 401 to reduce charge current to slow down the degradation rate (i.e., to make the slope of the degradation rate flatter). In some embodiments, Adjusting Logic 406 instructs Smart Battery 401 to reduce the charge-discharge voltage to slow down the degradation rate. In some embodiments, Adjusting Logic 406 instructs Smart Battery 401 to reduce the charge current and charge-discharge voltage simultaneously to slow down the degradation rate.

In some embodiments, Monitor 403 continues to monitor the degradation rate after adjustment of one or more parameters. If the degradation rate accelerates again above the threshold, then the above process is repeated and Adjusting Logic 406 instructs Smart Battery 401 to adjust the one or more parameters to slow down the degradation rate. Otherwise, the values of the one or more parameters are maintained at their previous levels.

Figure 5:
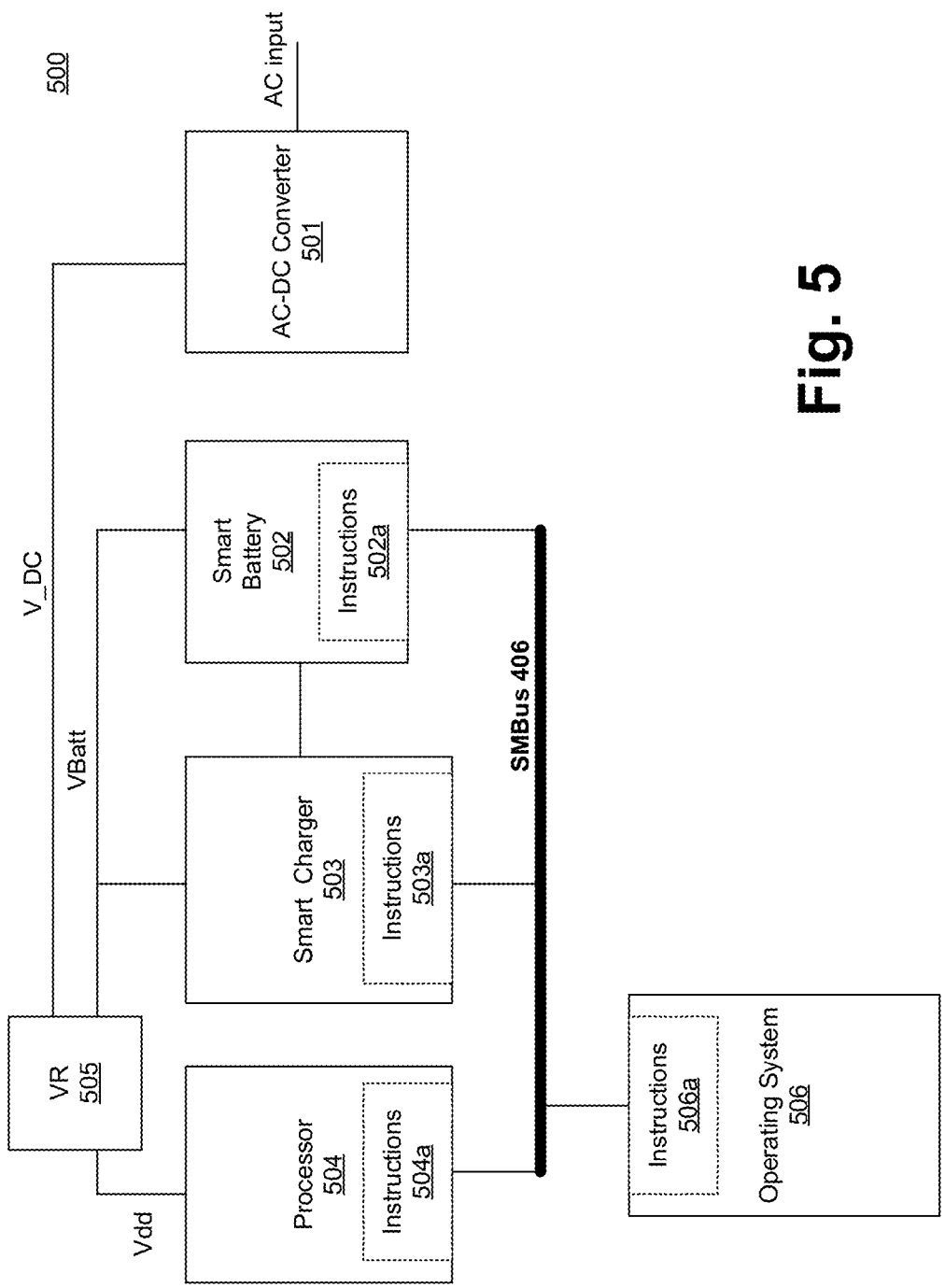
FIG. 5 illustrates an apparatus and machine-readable medium with instructions for extending the cycle-life of a battery by detecting degradation acceleration and changing one or more parameters for the battery to reduce degradation rate, according to some embodiments of the disclosure.

FIG. 5 illustrates apparatus 500 having machine-readable medium with computer executable instructions for extending cycle-life of a battery by detecting degradation acceleration and changing one or more parameters for the battery to reduce degradation rate, according to some embodiments of the disclosure. It is pointed out that those elements of FIG.

5 having the same reference numbers (or names) as the elements of any other figure can operate or function in any manner similar to that described, but are not limited to such. In some embodiments, apparatus 500 includes AC-DC Converter 501, Smart Battery 502, Smart Charger 503, Processor 504, Voltage Regulator (VR) 505, and Operating System 506.

In some embodiments, Smart Battery 502 and/or Smart Charger 503 comply with a Charger Specification, for example, Charger Specification Revision 1.1 Published Dec. 11, 1998 (or other revisions). In some embodiments, AC-DC Converter 501 receives AC input and generates an unregulated DC voltage V_DC for VR 505. In some embodiments, when AC input is present, VR 505 uses V_DC as input voltage supply to generate regulated output supply Vdd. In some embodiments, when AC input is present, Smart Charger 503 instructs Smart Battery 502 to charge using the V_DC. In some embodiments, when AC input is absent then Smart Battery 502 provides battery voltage VBatt for VR 505. In some embodiments, when AC input is absent, VR 505 uses VBatt as input voltage supply to generate regulated output supply Vdd. In such embodiments, Smart Battery 502 begins to discharge and the rate of discharge is monitored by Smart Charger 503 and/or Operating System 506.

In some embodiments, Smart Battery 502 is a Level 2 or Level 3 type charger which may interrogate Smart Battery 502 for its capacity, time remaining to full charge, battery temperature, or other data that may be used to determine the rate of degradation of Smart Battery 502. In some embodiments, Smart Charger 503 is programmed with maximum voltage and maximum current. The current diminishes from this maximum in the top-up stage of the charge cycle. In some embodiments, Smart Battery 502 can use the voltage( ) or current( ) function calls to find out what is actually happening regarding charge status. For example, voltage( ) or current( ) function calls may return a positive or negative voltage or current respectively depending on whether the battery cells in Smart Battery 502 are charging or discharging.

In some embodiments, Smart Battery 502 returns the charge current and/or terminal voltage levels to processor 504 and/or Operating System 506 at regular intervals so that Operating System 506 can determine the rate of degradation of Smart Battery 502.

In some embodiments, when Smart Charger 503 and/or Operating System 506 determine that the rate of degradation is above a threshold level, then Smart Charger 503, and/or Operating System 506 instruct Smart Battery 502 via message transmitted over SMBus 406 to adjust the one or more parameters to alter the rate of degradation. Smart Battery may also autonomously perform this function. In some embodiments, the process of monitoring the rate of degradation and adjusting or maintaining the one or more parameters is performed regularly throughout the life of Smart Battery 502.

In some embodiments, the process discussed here for slowing the rate of degradation is performed by a hardware, software, or combination of both hardware and software. For example, some or all of the processes for slowing the rate of degradation is performed by instructions 503a stored in a machine-readable storage medium in Smart Charger 503. In some embodiments, some or all processes for slowing the rate of degradation is performed by instructions 506a of Operating System 506. For example, instructions 506a may be a driver coupled to Operating System 506. An example pseudo-code implemented in instructions 503a/505a is expressed as:

```
If [average degradation over NUMBER of cycles] > threshold{
    charge_voltage = charge_voltage - voltage_step
}
If [average degradation over NUMBER cycles] > threshold{
    charge_current = charge_current - current_step
}
``` where "NUMBER" is a programmable or predetermined number (e.g., 5), "charge_voltage" is the terminal charge of Smart Battery 503, "threshold" is the acceptable rate of degradation, "voltage_step" is the amount of voltage to be reduced, and "current_step" is the amount of current to be reduced.

While the embodiments are described with reference to Smart Charger 503 and/or Operating System 506 monitoring the rate of degradation and then instructing Smart Battery 502 or Smart Charger 503 to adjust the one or more parameters, the functions of monitoring and/or instructing can be performed by a processor inside Smart Battery 502 as shown by dotted region having instructions 502a.

In some embodiments, the process of monitoring the rate of degradation and then instructing Smart Battery 502 to adjust the one or more parameters can be performed by Processor 504. For example, various instructions for monitoring Smart Battery 502 and adjusting the one or more parameters may be implemented by code (e.g., instructions 504a) in an embedded controller of Processor 504. In another example, various instructions for monitoring Smart Battery 502 and adjusting the one or more parameters may be implemented by BIOS (Built-in Operating System). In some embodiments, apparatus 500 is part of a mobile device (e.g., a smartphone, tablet PC, etc.).

Figure 6:
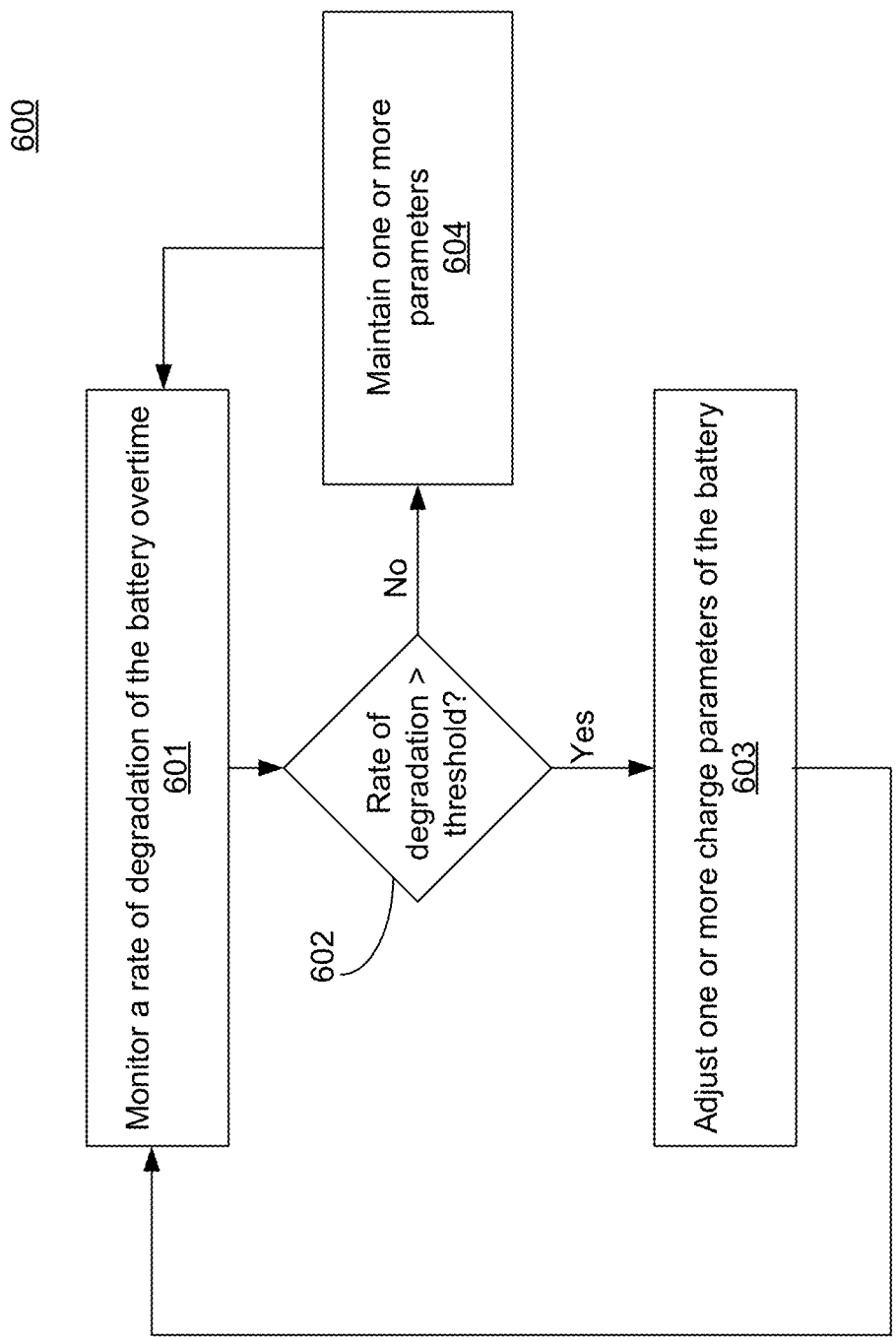
FIG. 6 illustrates a flowchart of a method for extending cycle-life of a battery by detecting degradation acceleration and changing one or more parameters for the battery to reduce degradation rate, according to some embodiments of the disclosure.

FIG. 6 illustrates flowchart 600 of a method for extending cycle-life of a battery by detecting degradation acceleration and changing one or more parameters for the battery to reduce degradation rate. It is pointed out that those elements of FIG. 6 having the same reference numbers (or names) as the elements of any other figure can operate or function in any manner similar to that described, but are not limited to such.

Although the blocks in the flowchart with reference to FIG. 6 are shown in a particular order, the order of the actions can be modified. Thus, the illustrated embodiments can be performed in a different order, and some actions/blocks may be performed in parallel. Some of the blocks and/or operations listed in FIG. 6 are optional in accordance with certain embodiments. The numbering of the blocks presented is for the sake of clarity and is not intended to prescribe an order of operations in which the various blocks must occur. Additionally, operations from the various flows may be utilized in a variety of combinations. In some embodiments, the process of flowchart 600 is implemented as computer executable instructions 503a/505a stored in Smart Charger 503, a Smart Battery 502 and/or Operating System 506.

At block 601, the rate of degradation of Smart Battery 401/502 is monitored overtime. The rate of degradation may be computed by software, hardware, or a combination of both according to various embodiments discussed here. At block 602, a determination is made whether the rate of degradation is greater than a threshold, where the threshold is an acceptable level of the rate of degradation. If the rate of degradation is greater than the threshold then at block 603, one or more charge parameters of the battery are adjusted. The one or more charge parameters include charge current and charge voltage.

In some embodiments, charge current which is reduced to slow down the rate of degradation, is monitored again. In some embodiments, charge voltage is reduced to decrease the rate of degradation. In some embodiments, both charge current and charge voltage are reduced to slow down the rate of degradation. The process then proceeds back to block 601. If the rate of degradation is less than or equal to the threshold, then at block 604 the previous values of the one or more parameters are maintained (i.e., current charge and/or charge voltage are held at previous levels). The process then proceeds to block 601.

In some embodiments, program software code/instructions 505a/503a associated with flowchart 600 and executed to implement embodiments of the disclosed subject matter may be implemented as part of operating system 506 or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 600 are executed by a controller of Smart Charger 503.

The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in a same communication session.

The software program code/instructions (associated with flowchart 600) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, a tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Blackberry® Droid®, or the like, or any other device including a computing device. In one embodiment, processor-based system is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Figure 7:
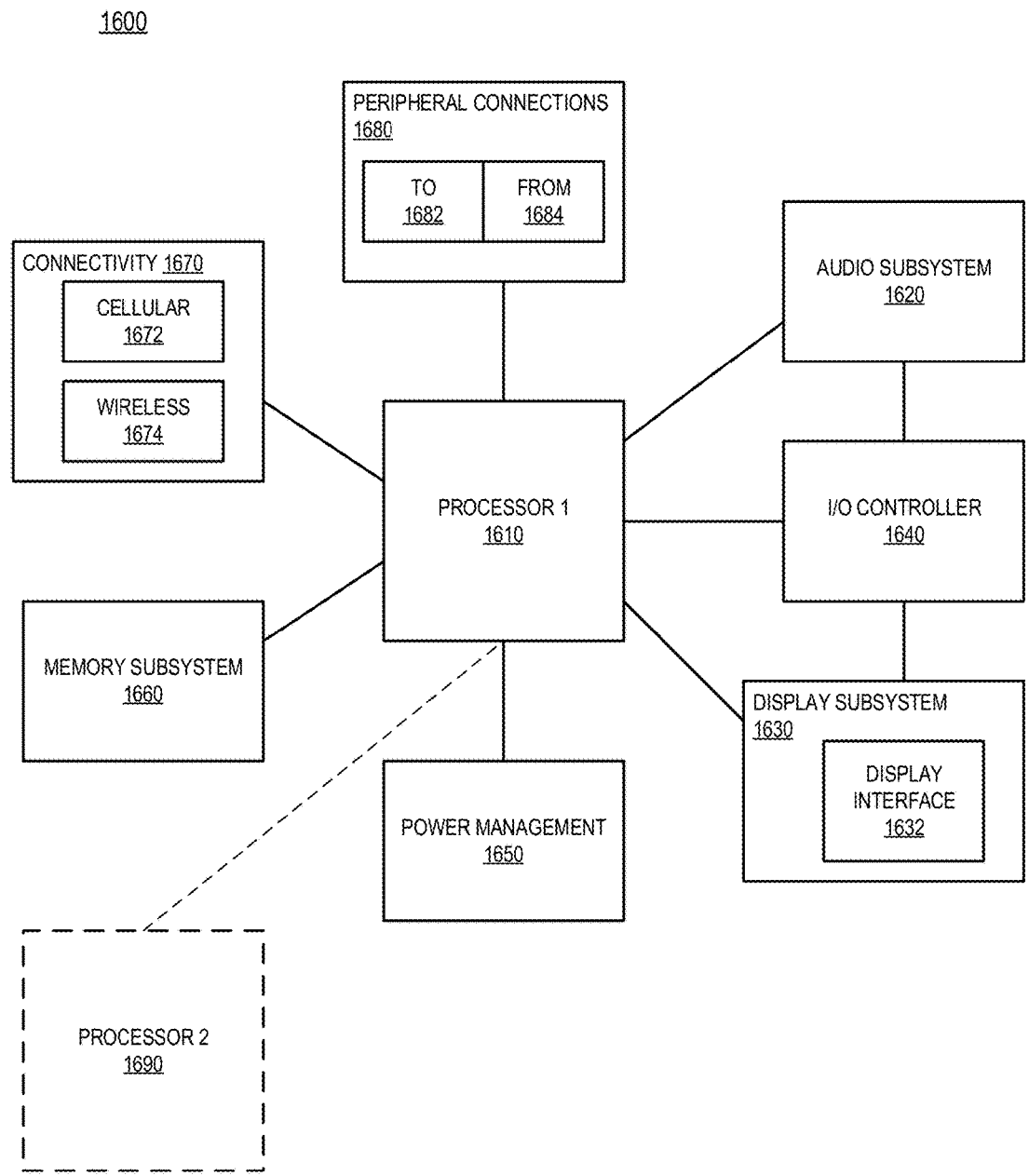
FIG. 7 illustrates a smart device or a computer system or a SoC (System-on-Chip) having apparatus and/or machine-readable medium with instructions for extending cycle-life of a battery by detecting degradation acceleration and changing one or more parameters for the battery to reduce degradation rate, according to some embodiments of the disclosure.

FIG. 7 illustrates a smart device or a computer system or a SoC (System-on-Chip) having apparatus and/or machine-readable medium with instructions for extending cycle-life of a battery by detecting degradation acceleration and changing one or more parameters for the battery to reduce degradation rate, according to some embodiments of the disclosure. It is pointed out that those elements of FIG. 7 having the same reference numbers (or names) as the elements of any other figure can operate or function in any manner similar to that described, but are not limited to such.

FIG. 7 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 having apparatus and/or machine-readable medium with instructions for extending cycle-life of a battery by detecting degradation acceleration and changing one or more parameters for the battery to reduce degradation rate, according to some embodiments discussed. Other blocks of the computing device 1600 may also apparatus and/or machine-readable medium with instructions for extending cycle-life of a battery by detecting degradation acceleration and changing one or more parameters for the battery to reduce degradation rate, according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600. In some embodiments, power management 1650 includes apparatus and/or machine-readable medium with instructions for extending cycle-life of the battery by detecting degradation acceleration and changing one or more parameters for the battery to reduce degradation rate.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 includes connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 includes Peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), Display- Port including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, a machine-readable storage media is providing having machine executable instructions stored thereon that, when executed, causes a processor to perform a method, the method comprising: monitoring a rate of degradation of a battery cell overtime; comparing the rate of degradation with a threshold; and adjusting one or more charge parameters of the battery cell when the rate of degradation crosses the threshold. In some embodiments, the machine-readable storage media comprising maintaining the one or more charge parameters at their present values when the rate of degradation remains substantially the same.

In some embodiments, comparing the rate of degradation with a threshold comprises comparing an average of the rate of degradation over multiple charge-discharge cycles. In some embodiments, adjusting of the one or more charge parameters comprises reducing charge current. In some embodiments, wherein adjusting of the one or more charge parameters comprises reducing charge-discharge voltage. In some embodiments, adjusting of the one or more charge parameters comprises reducing charge current and reducing charge-discharge voltage.

In some embodiments, the threshold is a programmable threshold. In some embodiments, the one or more charge parameters are at least one of: a charge current; a charge-discharge voltage; or a combination of charge current and charge-discharge voltage.

In another example, an apparatus is provided which comprises: a monitor to monitor a rate of degradation of a battery cell overtime; a comparator to compare the rate of degradation with a threshold; and logic to adjust one or more charge parameters of the battery cell when the rate of degradation crosses the threshold. In some embodiments, the logic is operable to maintain the one or more charge parameters at their present values when the rate of degradation remains substantially the same.

In some embodiments, the comparator is to compare the rate of degradation with a threshold by comparing an average of the rate of degradation over multiple charge-discharge cycles. In some embodiments, the logic is to adjust the one or more charge parameters by reducing charge current. In some embodiments, the logic is to adjust the one or more charge parameters by reducing the charge-discharge voltage. In some embodiments, the logic is to adjust the one or more charge parameters by reducing charge current and reducing charge-discharge voltage. In some embodiments, the threshold is a programmable threshold. In some embodiments, the one or more charge parameters are at least one of: a charge current; a charge-discharge voltage; or a combination of charge current and charge-discharge voltage.

In another example, a system is provided which comprises: a memory; a processor coupled to the memory; a battery to provide power to the memory and the processor, the battery having circuitry including: a comparator to compare a rate of degradation with a threshold; and logic to adjust one or more charge parameters of the battery when the rate of degradation crosses the threshold; and a wireless interface for allowing the processor to communicate with another device.

In some embodiments, the logic is operable to maintain the one or more charge parameters at their present values when the rate of degradation remains substantially the same. In some embodiments, the logic is operable to maintain the one or more charge parameters at their present values when the rate of degradation remains substantially the same. In some embodiments, the one or more charge parameters are at least one of: a charge current; a charge-discharge voltage; or a combination of charge current and charge-discharge voltage.

In another example, a method is provided which comprises: monitoring a rate of degradation of a battery cell overtime; comparing the rate of degradation with a threshold; and adjusting one or more charge parameters of the battery cell when the rate of degradation crosses the threshold. In some embodiments, the method comprises maintaining the one or more charge parameters at their present values when the rate of degradation remains substantially the same. In some embodiments, comparing of the rate of degradation with a threshold comprises comparing an average of the rate of degradation over multiple charge-discharge cycles.

In some embodiments, adjusting of the one or more charge parameters comprises reducing charge current. In some embodiments, adjusting of the one or more charge parameters comprises reducing charge-discharge voltage. In some embodiments, adjusting of the one or more charge parameters comprises reducing charge current and reducing charge-discharge voltage. In some embodiments, the threshold is a programmable threshold. In some embodiments, the one or more charge parameters are at least one of: a charge current; a charge-discharge voltage; or a combination of charge current and charge-discharge voltage.

In another example, an apparatus is provided which comprises: means for monitoring a rate of degradation of a battery cell overtime; means for comparing the rate of degradation with a threshold; and means for adjusting one or more charge parameters of the battery cell when the rate of degradation crosses the threshold. In some embodiments, the apparatus comprises means for maintaining the one or more charge parameters at their present values when the rate of degradation remains substantially the same.

In some embodiments, the means for comparing of the rate of degradation with a threshold comprises means for comparing an average of the rate of degradation over multiple charge-discharge cycles. In some embodiments, the means for adjusting of the one or more charge parameters comprises means for reducing charge current. In some embodiments, the means for adjusting of the one or more charge parameters comprises means for reducing charge-discharge voltage. In some embodiments, the means for adjusting of the one or more charge parameters comprises means for reducing charge current and reducing charge-discharge voltage. In some embodiments, the threshold is a programmable threshold. In some embodiments, the one or more charge parameters are at least one of: a charge current; a charge-discharge voltage; or a combination of charge current and charge-discharge voltage.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. A machine-readable storage media having machine executable instructions stored thereon that, when executed, causes a processor to perform a method, the method comprising:
    monitoring a rate of degradation of a battery cell overtime, wherein the rate of degradation is a ratio of a difference in capacity of the battery cell to a difference in number of charge/discharge cycles;
    comparing the rate of degradation with a threshold; and
    adjusting one or more charge parameters of the battery cell when the rate of degradation crosses the threshold, wherein the adjusting of the one or more charge parameters is to slow the rate of degradation of the battery cell to extend cycle life of the battery cell.

2. The machine-readable storage media of claim 1 comprising maintaining the one or more charge parameters at their present values when the rate of degradation remains substantially the same.

3. The machine-readable storage media of claim 1, wherein comparing the rate of degradation with a threshold comprises comparing an average of the rate of degradation over multiple charge-discharge cycles.

4. The machine-readable storage media of claim 1, wherein adjusting of the one or more charge parameters comprises reducing charge current.

5. The machine-readable storage media of claim 1, wherein adjusting of the one or more charge parameters comprises reducing charge-discharge voltage.

6. The machine-readable storage media of claim 1, wherein adjusting of the one or more charge parameters comprises reducing charge current and reducing charge-discharge voltage.

7. The machine-readable storage media of claim 1, wherein the threshold is a programmable threshold.

8. The machine-readable storage media of claim 1, wherein the one or more charge parameters are at least one of:
    a charge current;
    a charge-discharge voltage; or
    a combination of charge current and charge-discharge voltage.

9. An apparatus comprising:
    a monitor to monitor a rate of degradation of a battery cell overtime, wherein the rate of degradation is a ratio of a difference in capacity of the battery cell to a difference in number of charge/discharge cycles;
    a comparator to compare the rate of degradation with a threshold; and
    logic to adjust one or more charge parameters of the battery cell when the rate of degradation crosses the threshold, wherein the logic is to adjust of the one or more charge parameters to slow the rate of degradation of the battery cell to extend cycle life of the battery cell.

10. The apparatus of claim 9, wherein the logic is operable to maintain the one or more charge parameters at their present values when the rate of degradation remains substantially the same.

11. The apparatus of claim 9, wherein the comparator is to compare the rate of degradation with a threshold by comparing an average of the rate of degradation over multiple charge-discharge cycles.

12. The apparatus of claim 9, wherein the logic is to adjust the one or more charge parameters by reducing charge current.

13. The apparatus of claim 9, wherein the logic is to adjust the one or more charge parameters by reducing the charge-discharge voltage.

14. The apparatus of claim 9, wherein the logic is to adjust the one or more charge parameters by reducing charge current and reducing charge-discharge voltage.

15. The apparatus of claim 9, wherein the threshold is a programmable threshold.

16. The apparatus of claim 9, wherein the one or more charge parameters are at least one of:
    a charge current;
    a charge-discharge voltage; or
    a combination of charge current and charge-discharge voltage.

17. A system comprising:
    a memory;
    a processor coupled to the memory;
    a battery to provide power to the memory and the processor, the battery having circuitry including:
        a comparator to compare a rate of degradation with a threshold, wherein the rate of degradation is a ratio of a difference in capacity of the battery cell to a difference in number of charge/discharge cycles; and logic to adjust one or more charge parameters of the battery when the rate of degradation crosses the threshold, wherein the logic is to adjust of the one or more charge parameters to slow the rate of degradation of the battery cell to extend cycle life of the battery cell; and a wireless interface to allow the processor to communicate with another device.

18. The system of claim 17, wherein the logic is operable to maintain the one or more charge parameters at their present values when the rate of degradation remains substantially the same.

19. The system of claim 17, wherein the logic is operable to maintain the one or more charge parameters at their present values when the rate of degradation remains substantially the same.

20. The system of claim 17, wherein the one or more charge parameters are at least one of:

a charge current;

a charge-discharge voltage; or a combination of charge current and charge-discharge voltage.

\* \* \* \* \*